(12) United States Patent
Brailovskiy et al.

(10) Patent No.: US 9,838,614 B1
(45) Date of Patent: Dec. 5, 2017

(54) MULTI-CAMERA IMAGE DATA GENERATION

(71) Applicant: Amazon Technologies, Inc., Seattle, WA (US)

(72) Inventors: Ilya Vladimirovich Brailovskiy, Mountain View, CA (US); Nathaniel Bubis, Tel Aviv (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/187,044

(22) Filed: Jun. 20, 2016

(51) Int. Cl.
  *H04N 5/247* (2006.01)
  *G06K 9/46* (2006.01)
  *G06K 9/62* (2006.01)
  *H04N 5/265* (2006.01)

(52) U.S. Cl.
  CPC ........... *H04N 5/247* (2013.01); *G06K 9/4671* (2013.01); *G06K 9/6277* (2013.01); *H04N 5/265* (2013.01)

(58) Field of Classification Search
  CPC ...... H04N 5/247; H04N 5/265; G06K 9/6277; G06K 9/4671
  See application file for complete search history.

(56) References Cited

U.S. PATENT DOCUMENTS

| 8,314,837 | B2* | 11/2012 | Kenny | G02B 21/244 348/79 |
| 8,791,984 | B2* | 7/2014 | Jones | G08B 13/19641 348/159 |
| 9,639,935 | B1* | 5/2017 | Douady-Pleven | G06T 7/0018 |
| 2013/0329012 | A1* | 12/2013 | Bartos | H04N 13/0246 348/46 |
| 2014/0294231 | A1* | 10/2014 | Datta | G06T 7/292 382/103 |
| 2015/0085080 | A1* | 3/2015 | Hollenbeck | G01B 11/25 348/47 |
| 2015/0172545 | A1* | 6/2015 | Szabo | H04N 5/23238 348/36 |

* cited by examiner

*Primary Examiner* — Padma Haliyur
(74) *Attorney, Agent, or Firm* — K&L Gates LLP

(57) ABSTRACT

Various examples are directed to systems, devices, and methods effective to generate updated pixel values in a stitched image. A processor may be programmed to identify a first block of pixels located in a region of a stitched image. The region may include pixels representing parallax views of a portion of a physical environment. The processor may determine a first average pixel value of pixels of the first block. The processor may identify a second block of pixels in the region. The processor may determine a second average pixel value of pixels of the second block. The processor may generate an updated pixel value for a pixel location of the first block or the second block. The updated pixel value may be based at least in part on the first average pixel value and the second average pixel value.

20 Claims, 7 Drawing Sheets

MULTI-CAMERA IMAGE DATA GENERATION

BACKGROUND

Camera systems may include multiple image sensors that may capture images with overlapping fields-of-view. Image processing systems may combine images captured from different viewpoints by individual image sensors to produce images with a wider fields-of-view relative to individual images. Individual image sensors may have different exposure settings and/or may experience different lighting conditions.

DETAILED DESCRIPTION

Figure 1A:
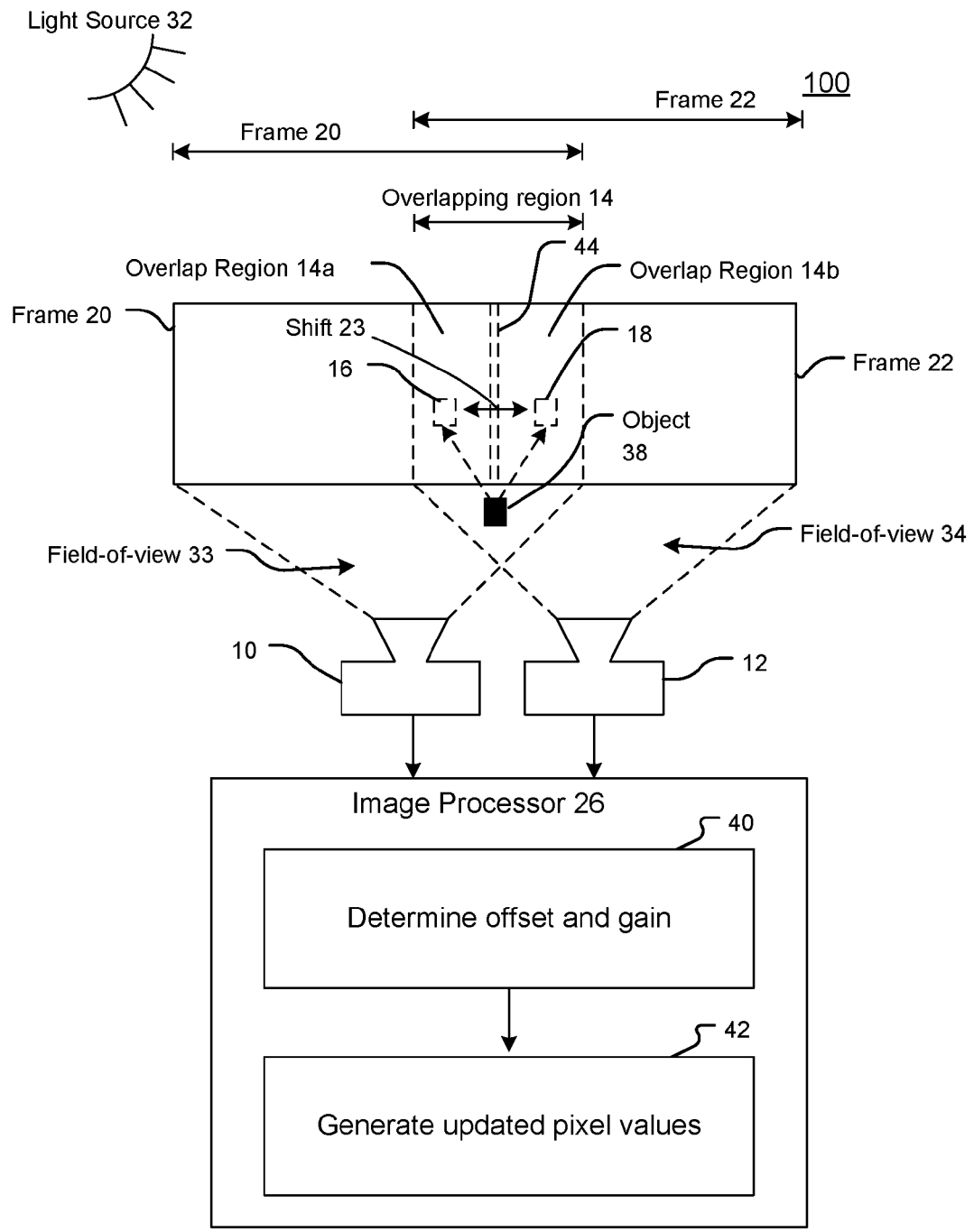
FIG. 1A is a diagram showing an example of an image processor system for generating updated pixel values in stitched image frames, in accordance with various aspects of the present disclosure.

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Technologies described herein generally relate to systems, methods, and techniques for reducing visible seams when multiple frames of image data are in stitched together and rendered on a display. Image frames may include a two-dimensional grid of pixels. The term pixel, as used herein, may refer to an individually controllable display unit in a frame of image data at a particular location in a two-dimensional grid. A pixel may have different pixel values, such as luminance values and/or chrominance values. Conceptually, to create a stitched image, portions of the two-dimensional pixel grids of constituent image frames may be aligned with one another, as is done when combining multiple images into a single panoramic image. The edges of aligned constituent frames may contain "overlapping" pixels, which may be combined into single pixels in the stitched frame by averaging the pixel values of the overlapping pixels from the multiple constituent images. The region of a stitched image frame that includes averaged pixel values of two constituent frames, as described above, may be referred to herein as an "overlap region" or "overlapping region". The overlap region of the stitched image may include data representations of the same portion of a physical environment from two or more parallax viewpoints of different image sensors. The overlap region can be made in any desired size or shape, and the pixels in the overlap region of the single image may be arranged in a two dimensional grid including any numbers of rows and columns.

Pixels in the stitched image may be divided into blocks (e.g., groups of pixels, each pixel having a corresponding pixel luminance value). Blocks may identify a group of pixel locations. The blocks that include pixels that represent the same area in real space (e.g., the same portion of the physical environment in the two cameras' fields of view) are matched together, as will be described in further detail below. A saliency score is calculated for each pair of matched blocks. Saliency scores relate to a confidence level that a particular pair of matched blocks (sometimes referred to herein as "corresponding blocks") represents the same portions of the physical environment. The average pixel value of the pixels in each block is determined. For example, the average luminance value and/or the average chrominance value may be calculated for the pixels of each block. The average pixel value of pixels of a particular block and the average pixel value of pixels of the matching block may comprise a single, two-dimensional data point. Data points for each pair of matching blocks may be plotted to determine a gain and an offset of a corrected luminance channel (and/or a corrected chrominance channel). In some examples, the gain and offset may be employed in an equation (e.g., a linear equation, a quadratic equation, a cubic equation, some other polynomial, etc.) used to calculate corrected pixel values (sometimes referred to herein as "updated pixel values"). Corrected pixel values may be calculated by inputting pixel luminance and/or chrominance values into the equation to output the corrected pixel luminance and/or chrominance value. The corrected pixel value is output at the same position in the block as the input pixel value (e.g., the position of the pixel with the luminance value that was input into the equation to generate the corrected pixel luminance value). Corrected pixel values may be calculated for each pixel in each pair of matching blocks. The stitched image frame including the corrected pixel values may be output so that the resulting image has blended luminance and/or chrominance across the overlap region when rendered on a display.

Figure 1B:
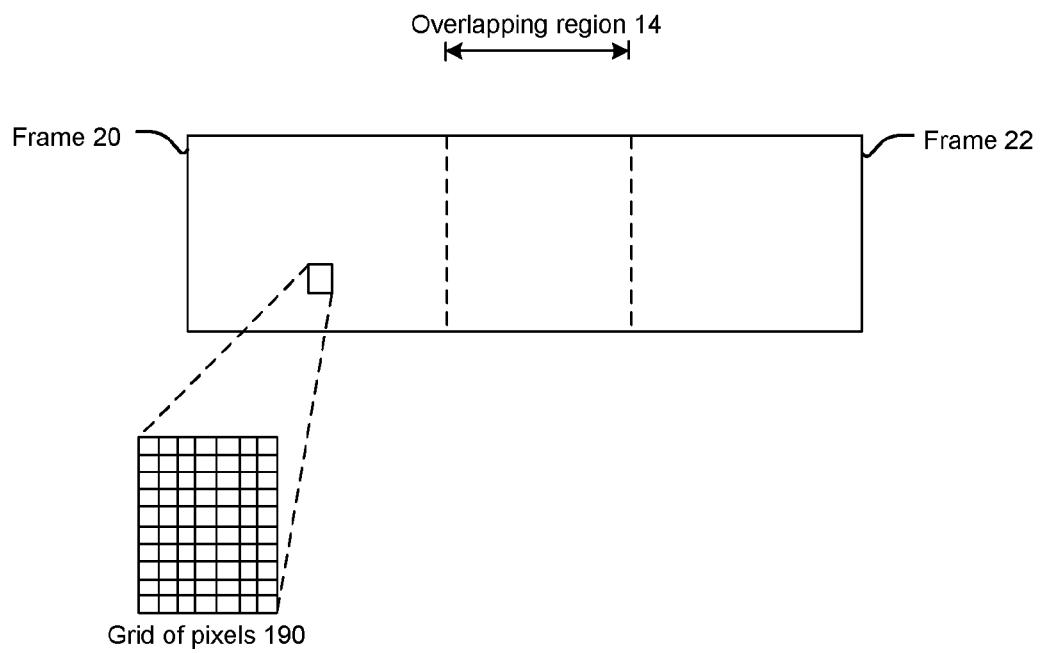
FIG. 1B is a diagram depicting a two dimensional grid of pixels in stitched image frames, in accordance with various aspects of the present disclosure.

FIG. 1 is a diagram showing an example of an image processor system in an environment 100 for generating corrected pixel values in stitched image frames. Image frames may be data that when rendered by a display unit produces a stand-alone image. In some examples, image frames may be sequentially rendered to produce video. The environment 100 comprises image sensors 10, 12 and image processor 26. Image sensors 10, 12 may be disposed at positions that are offset from one another, as shown. In an example, image sensor 10 may be positioned so as to capture image data which may be represented as frame 20. Image sensor 12 may be positioned so as to capture image data which may be represented as frame 22. Image sensors 10, 12 may comprise any suitable type of image sensor device or devices, such as a charge coupled device (CCD) and/or a complimentary metal-oxide semiconductor (CMOS) sensor. Image sensors 10, 12 may also include optics, such as lenses or other suitable optical components positioned to focus light towards the image sensors 10, 12. Each image sensor 10, 12 may have a respective field-of-view 33, 34 representing the portion of the environment 100 that is incident on the respective image sensor 10, 12. As illustrated, fields-of-view 33, 34 overlap at overlapping region 14. Frames 20, 22 may include image data comprising a plurality of pixels arranged according to a two-dimensional grid. FIG. 1B illustrates an example grid of pixels 190. The grid of pixels 190 is for illustrative purposes only and is not drawn to scale. As described herein, each pixel may be conceptually treated as an address of a controllable unit of image data with an associated value. For example, a pixel may correspond to a location on a two-dimensional grid (such as grid of pixels 190), and each pixel may be associated with one or more pixel values, such as chrominance values and/or luminance values, for example. Frames 20, 22 may represent respective, at least partially overlapping portions of environment 100. Frames 20, 22 may be captured by the image sensors 10, 12 and may be stitched together by image processor 26 to form a stitched frame, such as a panoramic frame.

Image processor 26 may include one or more processor units and/or a memory. Image processor 26 may be programmed to execute instructions stored in memory to process image data as described herein. For example, image processor 26 may be programmed to execute various algorithms, described in further detail below, programmed to generate corrected luminance and/or chrominance values across overlap regions of stitched frames.

In some examples, image sensors 10, 12 may be positioned so that one of image sensors 10, 12 receives more light than the other of image sensors 10, 12. For example, light source 32 may be positioned such that image sensor 10 receives more light from light source 32 than does image sensor 12. Accordingly, in such an example, if a uniform exposure is applied to image sensors 10, 12, frame 20, captured by image sensor 10, may be significantly more luminescent relative to frame 22, captured by image sensor 12. If frame 20 and frame 22 are stitched together into a stitched image, the difference in luminance may cause a visible seam 44 in the stitched image, where the stitched image appears brighter on one side of the seam 44 than on the other. Seam 44 may be a number of pixels in the overlap region 14 of frame 20 and frame 22 where a transition between a first luminance and/or chrominance of frame 20 and a second luminance and/or chrominance of frame 22 may be visible. As will be described in further detail below, image processor 26 may generate corrected luminance, chrominance, and/or exposure values for pixels disposed in overlap regions of frames captured by different image sensors (such as image sensors 10, 12) so that a smooth transition in luminance, chrominance, and/or exposure occurs in the overlap region 14. Overlap region 14 may include overlap regions 14a and 14b. Overlap region 14a represents the overlap region 14 from the perspective of image sensor 12. Overlap region 14b represents the overlap region 14 from the perspective of image sensor 10. Generating corrected luminance and/or chrominance values of pixels in overlap region 14 may eliminate or reduce unsightly seams (e.g., seam 44) in the overlap region 14 of frames 20, 22. Overlap region 14 is a subset of the pixels in frames 20, 22 that represent portions of environment 100 that are in both field-of-view 33 and field-of-view 34. Overlap region 14 is generated by image processor 26 by stitching frames 20, 22 together and aligning the two-dimensional grids of pixels in frames 20, 22 that represent the same portions of environment 100 with respect to one another.

Overlap regions 14a, 14b may be divided into blocks. A block, as described herein, may be a grouping of one or more pixels. Pixels in blocks of overlap regions 14a, 14b (and in frames 20 and 22) may be described in terms of pixel values such as luminance values and chrominance values. Luminance values may represent the brightness of a pixel. Chrominance values may represent the color of a pixel. Different sizes and shapes of blocks including various numbers of pixels may be used. Objects in environment 100 that are in the fields-of-view of both image sensors 10, 12, such as object 38, may appear twice as parallax objects in overlap regions 14a, 14b of frames 20, 22. Because the image sensors 10, 12 have different optical centers, the object 38 appears to be at different positions at the image plane of the different image sensors 10, 12. This can cause parallax or ghosting artifacts when frames 20, 22 are stitched to form a panoramic frame. For example, the object 38 (or a portion of object 38) may appear in a stitched frame as corresponding blocks 16 and 18 which are located at different positions in overlap regions 14a and 14b of the stitched panoramic image. A number of pixels between two positions in the horizontal or "x" coordinate plane may be referred to herein as a "shift." For example, shift 23 may represent the number of pixels between the positions of blocks 16 and 18. Blocks 16 and 18 correspond because they are the pixel representations of the same portion of environment 100, albeit from the different perspectives of image sensor 10 and image sensor 12. For example, corresponding blocks 16, 18 may be pixel data representing different views of object 38, or a portion of object 38. It is to be understood that the various regions depicted in FIG. 1, such as the shift 23, are not drawn to scale to improve clarity.

The average luminance value and/or chrominance value of pixels of blocks 16 and 18 may differ due to the different amount of light received by image sensors 10, 12 from light source 32. The average luminance value for a particular block may be calculated by adding the luminance value of each pixel in the block and dividing by the total number of pixels in the block. Similarly, the average chrominance value may be calculated by adding the chrominance values of each pixel in the block and dividing by the total number of pixels in the block. In the example depicted in FIG. 1, image sensor 10 may receive more light from light source 32 than image sensor 12. Accordingly, block 18 may have a greater average luminance value and/or chrominance value relative to block 16. Similarly, other sets of corresponding blocks in overlap region 14 may experience differences in average chrominance values and/or luminance values due to the differing amounts of light received by image sensors 10, 12. Such differences may cause discrepancies in the brightness and/or color displayed when stitched together frames 20, 22 are rendered on a display. In addition to differing amounts of light received by different image sensors, discrepancies in brightness values and/or color values of pixels in overlapping regions of stitched frames may also be caused by inconsistent calibration of white balance settings for image sensors 10, 12 and/or by differences in exposure between image sensors 10, 12.

In the examples depicted in FIG. 1, image processor 26 may be programmed to generate updated chrominance and/or luminance values of pixels across overlap regions 14a, 14b to correct brightness and/or color discrepancies such as those described above. Correcting the brightness value and/or color value discrepancies between overlap regions 14a and 14b may be effective to reduce or eliminate the visible seam 44 by reducing the differences in luminance values between pixels or blocks of pixels in frame 20 and corresponding pixels or blocks of pixels in frame 22 in the overlapping region 14. Image processor 26 may determine sets of corresponding blocks in overlap regions 14a, 14b such as blocks 16, 18. Blocks may generally correspond because they represent the same portion of the environment but were captured by image sensors with differing viewpoints of the portion of the environment. In an example, sets of corresponding blocks in overlap regions 14a, 14b may be determined by calculating the sum of absolute differences between pixel values of blocks and/or by normalized cross correlation of pixel values (such as chrominance values and/or luminance values). For example, if the sum of absolute differences between pixel values of a first block and the average pixel value of the first block corresponds closely (e.g., within a threshold amount) to a second sum of absolute differences between pixel values of a second block and the average pixel value of the second block, it may be determined that the first block and the second block are a corresponding pair. In some examples, the integral image of overlap region 14a and overlap region 14b may be calculated in order to reduce the complexity and/or number of computations necessary to determine pairs of corresponding blocks. In an integral image, each pixel takes the value of the summation of the pixel values above and to the left of that pixel. The integral image may be calculated for the luminance channel, the chrominance channel, or both. The integral image may be used to calculate the average luminance value and/or chrominance value for each block in overlap region 14a and for each corresponding or "shifted" block in the overlap region 14b. As will be described in further detail below, at action 40, image processor 26 may process the average luminance value and/or chrominance value for each pair of corresponding blocks in overlap regions 14a, 14b to determine an offset and a gain for a corrected luminance channel and/or chrominance channel of overlap regions 14a, 14b. A corrected luminance channel may provide updated luminance values across pixels of overlap region 14 such that luminance values are gradually blended across the pixels in overlap region 14. After correcting luminance values for pixels of overlap region 14, the brightness of stitched frames 20, 22 may appear to be relatively uniform across overlap region 14 when stitched frames 20, 22 are rendered on a display. Similarly, a corrected chrominance channel may provide updated chrominance values across pixels of overlap region 14 such that chrominance values are gradually blended across the pixels in overlap region 14. After correcting chrominance values for pixels of overlap region 14, color may appear to be relatively uniform across overlap region 14 when stitched frames 20, 22 are rendered on a display.

At action 42, image processor 26 may generate updated pixel values in overlap regions 14a, 14b using the offset and gain determined at action 40 for the corrected luminance channel and/or chrominance channel of overlap regions 14a, 14b. In some examples, image processor 26 may individually determine a first gain and a first offset for the luminance channel and a second gain and a second offset for the chrominance channel. In such an example, luminance of pixels may be blended in the overlap region 14 based on the first gain and first offset and chrominance of pixels may be blended in the overlap region 14 based on the second gain and second offset. In another example, the gain and offset for either the luminance channel or chrominance channel may be determined. Chrominance and luminance of pixels of overlap region 14 may be blended based on the gain and offset.

Figure 2:
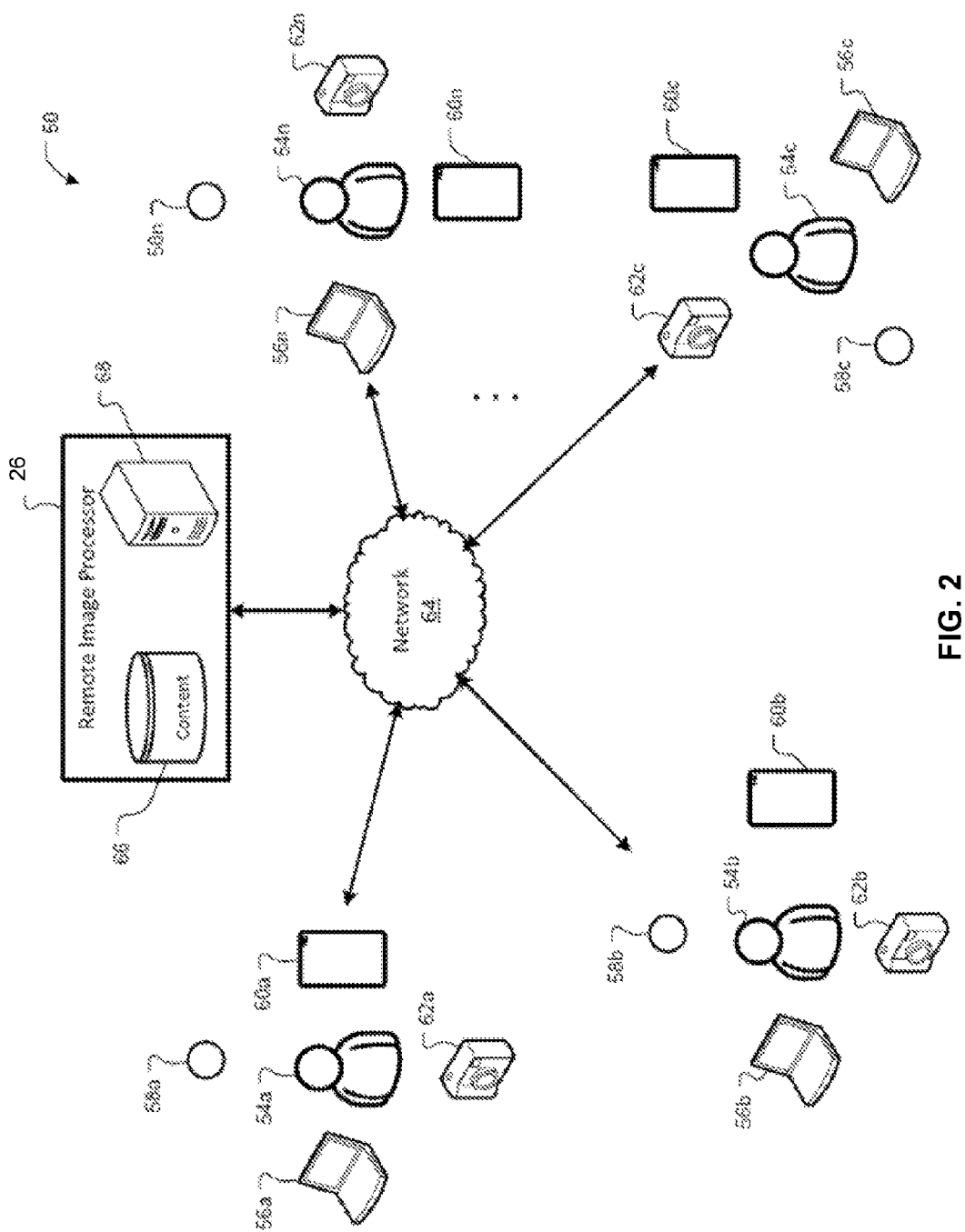
FIG. 2 is a diagram showing multiple devices configured in communication with a remote image processor over a network.

FIG. 2 is a diagram showing multiple devices configured in communication with a remote image processor over a network in an environment 50. The environment 50 comprises image processor 26 and users 54a, 54b, 54c, 54n. Each user 54a, 54b, 54c, 54n may use one or more user devices such as, for example, multi-camera systems 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 2 is associated with a multi-camera system 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture frames, transmit images and/or videos to the image processor 26, stitch frames into panoramic frames, generate corrected pixel values in overlap regions of stitched frames, verify stitching and/or corrective pixel data creation algorithms, etc., as described herein. Multi-camera systems 58a, 58b, 58c, 58n may include one or more image sensors and associated optics to capture image frame data. Image frames may be stitched together to form wide view angle images. In some examples, the view angle of a stitched image may comprise an angle of between 55° and 360°. In various examples, multi-camera systems 58a, 58b, 58c, 58n may capture and stitch together sequential frames to form video. Multi-camera systems 58a, 58b, 58c, 58n may have a panoramic field-of-view, as described herein. In some examples, a multi-camera system 58a, 58b, 58c, 58n may comprise a single image sensor with lenses, mirrors or other optics allowing the single image sensor to receive electromagnetic radiation (e.g., light) from a field-of-view that is larger than about 55°. In some examples, a multi-camera system 58a, 58b, 58c, 58n may comprise multiple image sensors (e.g., with overlapping fields-of-view). The multi-camera system 58a, 58b, 58c, 58n (or another component of the environment 50) may be configured to stitch frames from the respective image sensors into a single frame with a wider field of view relative to the constituent stitched frames. The multi-camera system 58a, 58b, 58c, 58n (or another component of the environment 50) may be configured to generate corrected luminance values and/or chrominance values of pixels and/or blocks in overlap regions of stitched frames. In some examples, multi-camera systems 58a, 58b, 58c, 58n may be configured to communicate with other components of the environment 50 utilizing, for example, a wired or wireless connection. For example, a multi-camera system 58a, 58b, 58c, 58n may upload a frame or frames to a mobile device 60a, 60b, 60c, 60n or computing device 56a, 56b, 56c, 56n via a wired connection, such as Universal Serial Bus (USB), or wireless connection, such as near field communication (NFC) or Bluetooth. In some examples, a multi-camera system 58a, 58b, 58c, 58n may be configured to upload images and/or video directly to a image processor 26, for example, via the network 64. Also, in some examples, a multi-camera system 58a, 58b, 58c, 58n may comprise a processor and/or other components to implement an image processor (e.g., for pixel blending in multi-camera frame stitching, as described herein).

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth. In some examples, a digital camera 62a, 62b, 62c, 62n may be configured to upload images and/or video directly to a image processor 26, for example, via the network 64. Also, in some examples, a digital camera 62a, 62b, 62c, 62n may comprise a processor and/or other components to implement pixel blending, as described herein. Digital cameras 62a, 62b, 62c, 62n may have a standard or panoramic field-of-view.

A mobile device 60a, 60b, 60c, 60n may be any suitable type of computing device comprising a processor and data storage. In some examples, a mobile device 60a, 60b, 60c, 60n may be configured to receive frames captured by a multi-camera system 58a, 58b, 58c, 58n or digital camera 62a, 62b, 62c, 62n and transfer the frames for processing at the image processor 26. In some examples, a mobile device 60a, 60b, 60c, 60n may execute an image processor for stitching frames received, for example, from digital camera 62a, 62b, 62c, 62n. In some examples, an image processor executed by one or more of mobile devices 60a, 60b, 60c, 60n may generate corrected pixel values (such as luminance values and/or chrominance values) in stitched frames, as described herein. Also, in some examples, a mobile device 60a, 60b, 60c, 60n may comprise one or more image sensors and associated optics for capturing images and/or video. Additionally, in some examples, mobile devices 60a, 60b, 60c, 60n may either upload the resulting frames to the image processor 26 or execute an image processor. In some examples, a mobile device 60a, 60b, 60c, 60n may be configured to communicate on a cellular or other telephone network.

A computing device 56a, 56b, 56c, 56n may be any suitable type of computing device comprising a processor and data storage including, for example, a laptop computer, a desktop computer, etc. In some examples, a computing device 56a, 56b, 56c, 56n may be configured to receive frames captured by a multi-camera system 58a, 58b, 58c, 58n or digital camera 62a, 62b, 62c, 62n and transfer the frames for processing at the image processor 26. In some examples, a computing device 56a, 56b, 56c, 56n may be configured to execute an image processor for processing frames received, for example, from a multi-camera system 58a, 58b, 58c, 58n or digital camera 62a, 62b, 62c, 62n. Also, in some examples, a computing device 56a, 56b, 56c, 56n may comprise one or more image sensors and associated optics for capturing frames and either uploading the resulting frames to the image processor 26 or performing executing an image processor.

The optional image processor 26 may perform the various utilities described herein including, for example, calculating the integral image of overlap regions of stitched frames, determining shifts between corresponding blocks in overlap regions, determining saliency scores of blocks in overlap regions of stitched frames received from users 54a, 54b, 54c, 54n (e.g., user devices associated with the user), determining the gain and offset of a corrected luminance and/or chrominance channel, and changing the luminance and/or chrominance values of one or more pixels in the overlap region of stitched frames, as described herein. The image processor 26 may comprise one or more data stores 66 and one or more servers 68. The data store 66 may store frames (e.g., images and/or videos comprising a plurality of pixel values) received from the various user devices, motion kernels, and/or other data associated with frame stitching and/or correcting pixel values. The various components 68, 66 of the image processor 26 may be at a common geographic location and/or may be distributed across multiple geographic locations. For example, the image processor 26 may be implemented in whole or in part as a cloud or Software as a Service (SaaS) system. In some examples, the image processor 26 may perform processing on frames received from multiple different users 54a, 54b, 54c, 54n (e.g., via their associated cameras, computing devices, or other devices). The various components of the environment 50 may be in communication with one another via a network 64. The network 64 may be and/or comprise any suitable wired or wireless network configured according to any suitable architecture or protocol. In some examples, the network 64 may comprise the Internet.

Figure 3:
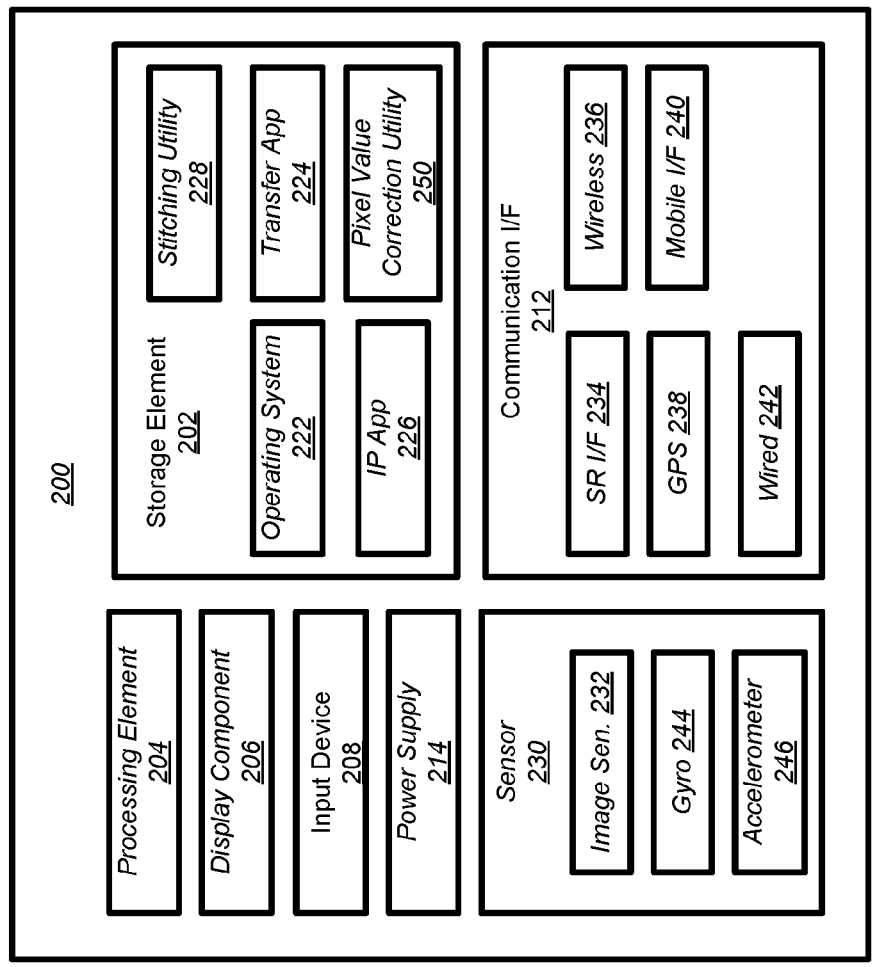
FIG. 3 is a block diagram showing an example architecture of a user device described herein.

FIG. 3 is a block diagram showing an example architecture 200 of a user device, such as the multi-camera systems, digital cameras, image processors, mobile devices and other computing devices described herein. It will be appreciated that not all user devices will include all of the components of the architecture 200 and some user devices may include additional components not shown in the architecture 200. The architecture 200 may include one or more processing elements 204 for executing instructions and retrieving data stored in a storage element 202. The processing element 204 may comprise at least one processor. Any suitable processor or processors may be used. For example, the processing element 204 may comprise one or more digital signal processors (DSPs). The storage element 202 can include one or more different types of memory, data storage or computer-readable storage media devoted to different purposes within the architecture 200. For example, the storage element 202 may comprise flash memory, random access memory, disk-based storage, etc. Different portions of the storage element 202, for example, may be used for program instructions for execution by the processing element 204, storage of images or other digital works, and/or a removable storage for transferring data to other devices, etc.

The storage element 202 may also store software for execution by the processing element 204. An operating system 222 may provide the user with an interface for operating the user device and may facilitate communications and commands between applications executing on the architecture 200 and various hardware thereof. A transfer application 224 may be configured to receive images and/or video from another device (e.g., a panoramic camera system, multi-camera system, or digital camera) or from an image sensor 232 included in the architecture 200. In some examples, the transfer application 224 may also be configured to upload the received frames to another device that may perform processing as described herein (e.g., a mobile device, another computing device, or image processor 26). In some examples, an image processor application 226 may perform processing on frames received from an image sensor of the architecture 200 and/or from another device. The image processor application 226 may be included, for example, at a panoramic camera system, a digital camera, a mobile device or another computer system. In some examples, where frame stitching or other processing is performed by a remote image processor or another component of the environment 50, the image processor application 226 may be omitted. A stitching utility 228 may stitch image frames and/or videos received from multiple image sensors into a single image and/or video. The stitching utility 228 may be included, for example, in a panoramic camera system and/or a mobile device or other computing device receiving input from a panoramic or other multi-camera system. Similarly, a pixel value correction utility 250 may correct luminance and/or chrominance values in stitched images and/or videos to eliminate visible stitching seams in stitched images and/or videos. The pixel value correction utility 250 may be included, for example, in a multi-camera system and/or a mobile device or other computing device receiving input from a panoramic camera system.

When implemented in some user devices, the architecture 200 may also comprise a display component 206. The display component 206 may comprise one or more light emitting diodes (LEDs) or other suitable display lamps. Also, in some examples, the display component 206 may comprise, for example, one or more devices such as cathode ray tubes (CRTs), liquid crystal display (LCD) screens, gas plasma-based flat panel displays, LCD projectors, or other types of display devices, etc.

The architecture 200 may also include one or more input devices 208 operable to receive inputs from a user. The input devices 208 can include, for example, a push button, touch pad, touch screen, wheel, joystick, keyboard, mouse, trackball, keypad, light gun, game controller, or any other such device or element whereby a user can provide inputs to the architecture 200. These input devices 208 may be incorporated into the architecture 100 or operably coupled to the architecture 200 via wired or wireless interface. When the display component 206 includes a touch sensitive display, the input devices 208 can include a touch sensor that operates in conjunction with the display component 206 to permit users to interact with the image displayed by the display component 206 using touch inputs (e.g., with a finger or stylus). The architecture 200 may also include a power supply 214, such as a wired alternating current (AC) converter, a rechargeable battery operable to be recharged through conventional plug-in approaches, or through other approaches such as capacitive or inductive charging.

The architecture 200 may also include a communication interface 212, comprising one or more wired or wireless components operable to communicate with one or more other user devices and/or with the image processor 26. For example, the communication interface 212 may comprise a wireless communication module 236 configured to communicate on a network, such as the network 64, according to any suitable wireless protocol, such as IEEE 802.11 or another suitable wireless local area network WLAN protocol. A short range interface 234 may be configured to communicate using one or more short range wireless protocols such as, for example, near field communications (NFC), Bluetooth, Bluetooth LE, etc. A mobile interface 240 may be configured to communicate utilizing a cellular or other mobile protocol. A Global Positioning System (GPS) interface 238 may be in communication with one or more earth-orbiting satellites or other suitable position-determining systems to identify a position of the architecture 200. A wired communication module 242 may be configured to communicate according to the Universal Serial Bus (USB) protocol or any other suitable protocol.

The architecture 200 may also include one or more sensors 230 such as, for example, one or more position sensors, image sensors, and/or motion sensors. An image sensor 232 is shown in FIG. 3. Some examples of the architecture 200 may include multiple image sensors 232. For example, a panoramic camera system or a multi-camera system may comprise multiple image sensors 232 resulting in multiple images and/or video frames that may be stitched and may be blended to form a seamless panoramic or wide-angle output. Motion sensors may include any sensors that sense motion of the architecture including, for example, gyro sensors 244 and accelerometers 246. Motion sensors, in some examples, may be included in user devices such as panoramic cameras, digital cameras, mobile devices, etc., that capture video or images for frame stitching. The gyro sensor 244 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 246 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 238 may be utilized as a motion sensor. For example, changes in the position of the architecture 200, as determined by the GPS interface 238, may indicate the motion of the GPS interface 238.

Figure 4:
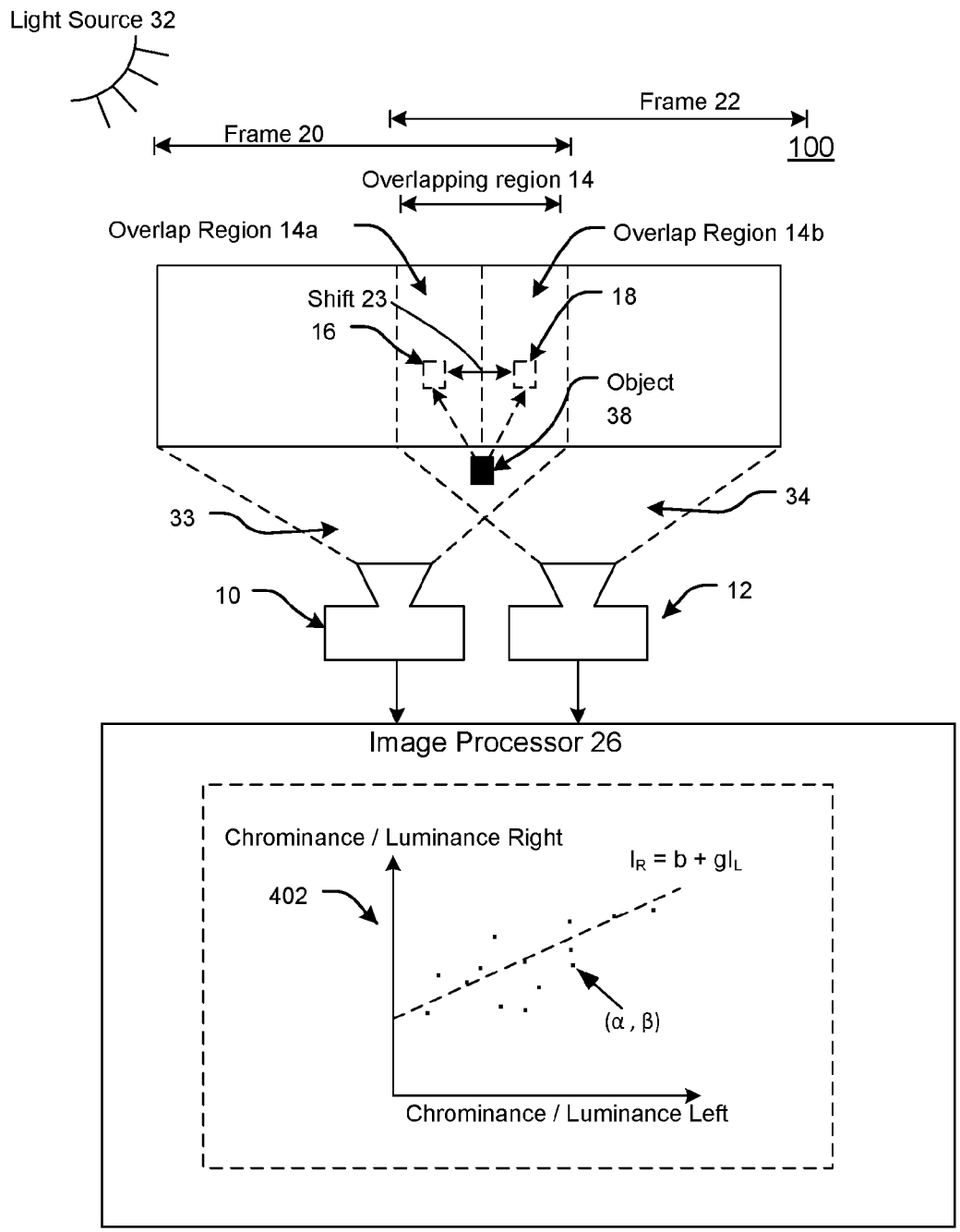
FIG. 4 depicts an example of a technique for an image processor system to generate updated pixel values in stitched image frames, in accordance with an aspect of the present disclosure.

FIG. 4 depicts an example of a technique for an image processor 26 to generate updated pixel values in stitched image frames in which a correspondence between blocks in overlap region 14 is determined. Those components in FIG. 4 described previously with regard to FIGS. 1-3 may not be described again for purposes of clarity and brevity.

A block in overlap region 14a may have a corresponding block in overlap region 14b due to the differing positions of image sensors 10, 12. Pixel values included in corresponding pairs of blocks may represent parallax views of the same area in real space. For example, pixel values included in corresponding pairs of blocks may represent parallax views of the same object and/or of the same portion of an object in environment 100. For a given block of pixels in one overlap region (e.g., overlap region 14a or overlap region 14b), the corresponding block in the other overlap region may be identified based on block matching techniques, as described herein. In some examples, corresponding blocks may be matched based on a correspondance between the average luminance value of pixels in the blocks and/or a correspondance between the standard deviations of pixel luminance values in the blocks. In some further examples, corresponding blocks may be matched based on the determined shift, in terms of a number of pixels between parallax objects in the two-dimensional grid of pixels in the overlap region. In still other examples, the sum of absolute differences between each pixel value in a first block and the average pixel value for the first block may be compared with the sum of absolute differences between each pixel value in a second block and the average pixel value for the second block. In another example, the normalized cross correlation of pixel values may be used to match corresponding blocks. Image processor 26 may determine the shift between two blocks in terms of a number of pixels disposed in a line between the two blocks in the "x" direction on the two-dimensional grid of pixels comprising frames 20, 22. An assumption may be made that corresponding blocks are only horizontally shifted (e.g., shifted in the x direction) and are not vertically shifted (e.g., shifted in they direction). This assumption may be made due to known placement of image sensors 10, 12. Accordingly, a shift between two corresponding blocks may include an "x" component, but no "y" component in the two-dimensional coordinate space of frames 20, 22.

Image processor 26 may be programmed to determine a saliency score for each pair of corresponding blocks. Saliency scores may be, for example, a confidence score indicating the likelihood that a first block and a second block correspond to one another. A relatively high saliency score may reflect a high confidence that the first block and second block correspond to one another, whereas a relatively low saliency score reflects a low confidence in the match. It should be understood that although "high" saliency scores are described herein as reflecting a high confidence that the first block and second block correspond to one another, "low" saliency scores may instead reflect a high confidence that the first block and second block correspond to one another, according to alternate implementations of the block-matching techniques described herein. Similarly, relatively high saliency scores may reflect a low confidence that the first block and second block correspond to one another, in various embodiments. Saliency scores may be determined by calculating the standard deviation of luminance values of pixels in the block and comparing this standard deviation to the standard deviation of luminance values of pixels in the corresponding, shifted block. For example, the standard deviation for a particular block of pixels may be found by the formula:

$$\sigma = \sqrt{\frac{\sum (x-\mu)^2}{N}}$$

where x is the luminance/chrominance value of each pixel in the block, μ is the average luminance/chrominance value of pixels in the block, N is the number of pixels in the block and a is the standard deviation. If the difference value representing the difference between the standard deviations of the two blocks is relatively low (e.g., lower than a threshold difference value), the saliency scores for the blocks will be high, indicating that the two blocks correspond closely to one another. Alternatively, if the difference value representing the difference between the standard deviations of the two blocks is relatively high (e.g., higher than the threshold difference value), the saliency scores for the blocks will be low, indicating that the blocks do not correspond very closely. In some examples, rather than calculate the standard deviation of pixel luminance values for a pair of corresponding blocks, image processor 26 may use a Fourier transform in the luminance and/or chrominance channel to determine the Fourier coefficients of corresponding blocks. A relatively high frequency Fourier coefficient (e.g., as compared to a threshold coefficient value) may indicate a high likelihood of correspondence between two blocks and may result in a relatively high saliency score. Similarly, a low Fourier coefficient (e.g., as compared to a threshold coefficient value) of two blocks may indicate a low likelihood of correspondence between two blocks and may result in a relatively low saliency score. Calculation of saliency scores is described in further detail below with reference to FIG. 6.

For each pair of corresponding blocks in overlap regions 14a, 14b, the average luminance value for the block in overlap region 14a may be referred to as "Luminance Left", while the average luminance value for the corresponding shifted block in overlap region 14b may be referred to as "Luminance Right." Similarly, for each pair of corresponding blocks in overlap regions 14a, 14b, the average chrominance value for the block in overlap region 14a may be referred to as "Chrominance Left", while the average chrominance value for the corresponding shifted block in overlap region 14b may be referred to as "Chrominance Right." Although the techniques described below in reference to FIG. 4 are described in the luminance channel for purposes of brevity and clarity, it will be appreciated by those skilled in the art that similar techniques may be employed in the chrominance channel to generate corrected chrominance values across overlap region 14 so that chrominance may appear to be uniformly blended across stitched frames 20, 22, when stitched frames 20, 22 are rendered on a display.

As shown in FIG. 4, image processor 26 may perform operations effective to plot each pair of corresponding blocks as a single data point in a two-dimensional coordinate space. Although image processor 26 is described herein as "plotting" various data points, in some examples image processor 26 may use various data structures that may be functionally equivalent to the "plot" described herein and shown in FIG. 4.

Blocks 16, 18 may be determined by image processor 26 to be a pair of corresponding blocks. Image processor 26 may determine the Luminance Left value of block 16 to be a and the Luminance Right value of block 18 as β. Image processor 26 may plot the average luminance values of corresponding blocks 16, 18 as a single point (α, β). Similarly, image processor 26 may plot Luminance Right vs. Luminance Left for each pair of corresponding blocks in overlap regions 14a, 14b. Image processor 26 may discard those blocks with average luminance values near zero and/or near a predetermined saturation value (e.g., within about 1%, about 2.5%, about 5%, etc., of zero and/or the saturation value). Similarly, image processor 26 may discard those blocks with saliency scores below a threshold value, such as a threshold saliency score, which may be pre-determined or calculated based upon frames 20, 22. A line may be fit to the resulting plot 402 of average luminance values of corresponding blocks in overlap regions 14a, 14b. In some examples, robust fitting methods such as M-estimators or random sample consensus (RANSAC) may be used to fit a line to points in plot 402. Image processor 26 may determine the equation of the fitted line, which may take the form of equation (1):

$$I_R = b + gI_L \qquad (1)$$

where $I_R$ is the average Luminance Right, $I_L$ is the average Luminance Left, g is the line slope, or gain, and b is the vertical offset (sometimes referred to as a "y intercept"). Image processor 26 may use the gain g and vertical offset b to calculate updated pixel values for the corrected luminance channels for pixels in overlap regions 14a, 14b, using equations (2) and (3):

$$I'_R = -\frac{b\sqrt{g}}{2} + \frac{1}{\sqrt{g}} I_R \qquad (2)$$

$$I'_L = \frac{b\sqrt{g}}{2} + \sqrt{g}\, I_L \qquad (3)$$

where $I'_R$ represents the corrected Luminance Right value for pixels in overlap region 14b and $I'_L$ represents the corrected Luminance Left value for pixels in overlap region 14a.

In some examples, depending on the types of image sensors used, a warping operation may be used to transform coordinates during the stitching of individual frames into a stitched frame or a panoramic frame. For example, image processor 26 may transform fisheye images captured by image sensors 10, 12 to cylindrical coordinates for the stitched image. The corrected luminance values $I'_R$ and/or $I'_L$ may be applied during the coordinate transform. Additionally, in some examples, corrected luminance values $I'_R$ and/or $I'_L$ need not be generated for every pixel in a block. For example, the corrected luminance values $I'_R$ and/or $I'_L$ may be generated for pixels located at the corners and/or edges of a block (e.g., in the two-dimensional grid of pixels comprising the block). Image processor 26 may use interpolation to automatically pre-calculate all corrected luminance values for pixels between the two corners and/or edges of the block without requiring individual corrected luminance value calculation for each pixel of the block by using, for example, Equations (2) and/or (3) above. Advantageously, using interpolation to pre-calculate the corrected luminance for the majority of pixels within a block may minimize power consumption by image processor 26 during operations related to the generation of corrected luminance values.

Equations (2) and/or (3) above may be used to update pixel values. For a given pixel value of a given pixel location within a first block, equation (2) or (3) above may output an updated pixel value for the given pixel location within the first block. An output image frame that includes the updated pixel value may be considered a new, updated image frame, or may be considered as the original input image frame with an updated pixel value at the particular pixel location within the first block. Blocks may identify a grouping of pixel locations in an image frame. Accordingly, an input image frame with original pixel values and an output image frame with one or more updated pixel values may include the same blocks, although the pixel values associated with particular pixels in those blocks may have changed.

In some other examples, respective gains $g_1$, $g_2$, $g_3$, ... $g_n$ and offsets $b_1$, $b_2$, $b_3$, ... $b_n$ may be calculated for multiple columns $v_1$ $v_2$, $v_3$, ... $v_n$ (e.g., regions of a particular width of pixels in the x direction and aligned along a y axis of the two-dimensional pixel grid of overlap regions 14a, 14b) within overlap regions 14a, 14b instead of for the entire overlap regions 14a, 14b. In various examples, the columns may have a height in terms of a number of pixels in the y direction that spans the entire height of frames 20, 22. In various other examples, vertical strips may have a height in terms of a number of pixels in they direction that spans a height that is less than the total height of frames 20, 22. For example, a first column of blocks in overlap region 14a may be selected. A second column of corresponding or shifted blocks in overlap region 14b may be determined. In some examples, the second column of corresponding or shifted blocks may be determined using the shift between corresponding blocks in overlap regions 14a, 14b. In other examples, the second column of corresponding or shifted blocks may be determined using block matching techniques, as described herein. Using columns for overlap regions 14a, 14b may increase the granularity of the transition between corrected luminance values of neighboring pixels across overlap regions 14a, 14b and may provide for smoother luminance transitions between stitched together frames 20, 22 when rendered on a display.

Figure 5:
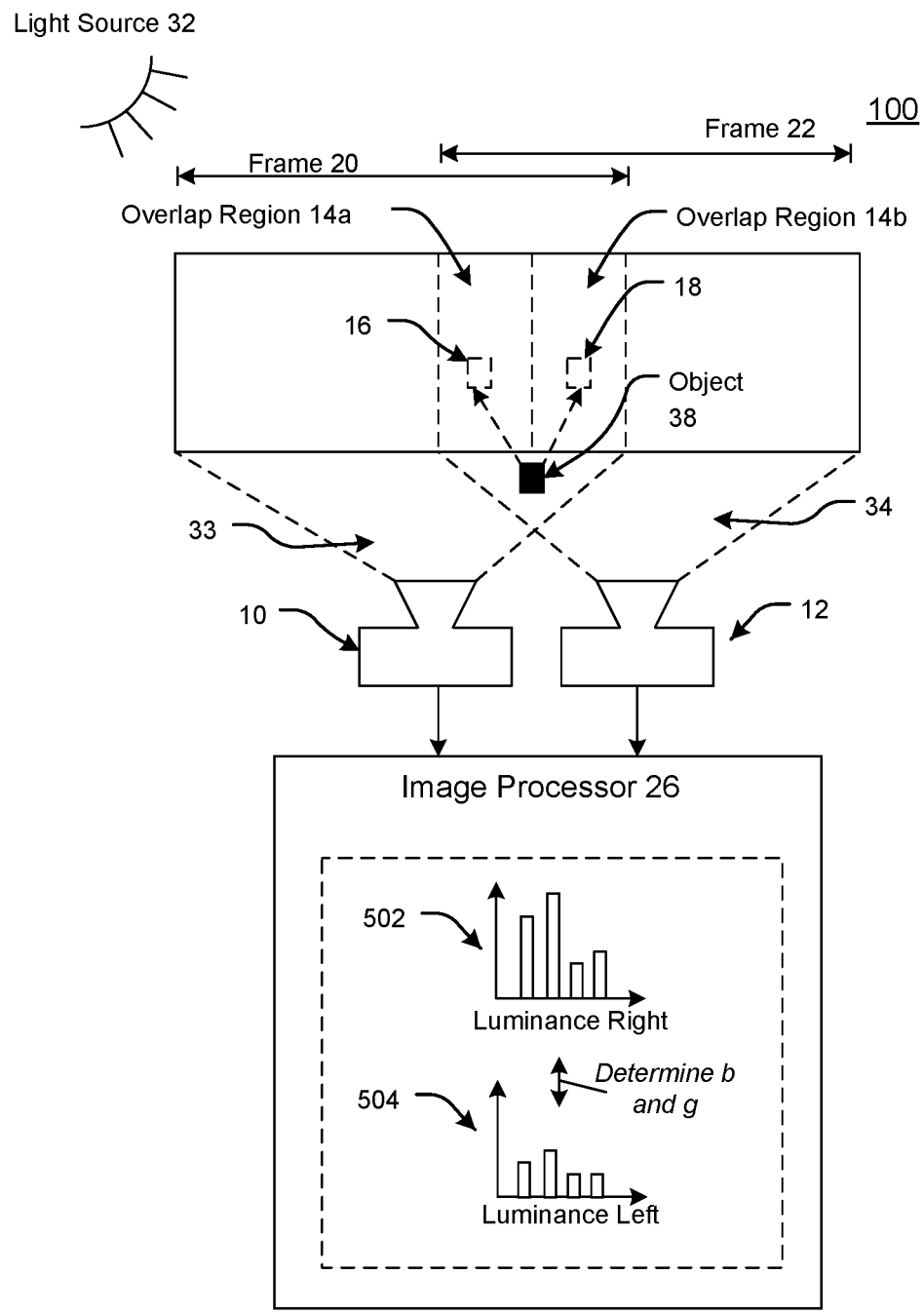
FIG. 5 depicts another example of a technique for an image processor system to generate updated pixel values in stitched image frames, in accordance with another aspect of the present disclosure.

FIG. 5 depicts another example of a technique for an image processor system to generate updated pixel values in stitched image frames, in accordance with another aspect of the present disclosure. Those components in FIG. 5 described previously with regard to FIGS. 1-4 may not be described again for purposes of clarity and brevity. Although the techniques described in FIG. 5 are described in the luminance channel for purposes of brevity and clarity, it will be appreciated by those skilled in the art that techniques similar to those described in FIG. 5 may be employed in the chrominance channel to blend chrominance values across overlap region 14.

In some examples, image processor 26 may determine a histogram 502 for "Luminance Right" average block luminance values and a histogram 504 for corresponding "Luminance Left" average block luminance values. Although image processor 26 is described herein as determining histograms representing various data points, in some examples image processor 26 may use various data structures that may be functionally equivalent to the "histograms" described herein and shown in FIG. 5. In various examples, the x-axis of histograms 502, 504 may be average luminance values and the y-axis may be a number of blocks exhibiting the average luminance values. In various examples, the average luminance values of the x-axis of histograms 502, 504 may be quantized into a discrete number of average luminance values. Image processor 26 may be further programmed to determine a cumulative distribution function for each of the histograms 502, 504. A cumulative distribution function is a function whose value is the probabiliity that a corresponding continuous random variable (e.g. average luminance values) has a value less than or equal to the argument of the function. Image processor 26 may be further programmed to take the average of the two cumulative distribution functions as the target distribution. Image processor 26 may select and apply different gain values g and offset values b to each of the two cumulative distribution functions to minimize the difference between histogram 502 and histogram 504. For example, image processor 26 may select and apply different gain values g and offset values b to each of the two cumulative distribution functions to transform the two cumulative distribution functions to the target distribution. In some examples, image processor 26 may use an iterative approach to select different values for g and b until the target distribution is reached. As described above in reference to FIG. 4, after determining the appropriate gain value g and offset value b, image processor 26 may calculate the corrected Luminance Right value $I'_R$ for pixels in overlap region 14b using equation (2) and the corrected Luminance Left value $I'_L$ using equation (3). A lookup table may be populated associating pixels of overlap region 14 to corrected luminance values $I'_R$ and/or $I'_L$. In some examples, shift 22 may be used to locate the appropriate pixel of overlap region 14 to take on the corrected luminance values $I'_R$ and/or $I'_L$.

Additionally, in some examples, corrected luminance values need not be looked up and/or calculated using equations (2) and (3) for every pixel in a block. For example, the corrected luminance values may be calculated for pixels at the corners and/or edges of a block. Interpolation may be used to automatically pre-calculate all corrected luminance values for pixels between the two corners and/or edges of the block without requiring individual corrected luminance calculation for each pixel of the block. Advantageously, using interpolation to pre-calculate the corrected luminance for the majority of pixels within a block may minimize power consumption by image processor 26 and/or by a device including image processor 26 by eliminating a number of lookup operations.

Figure 6:
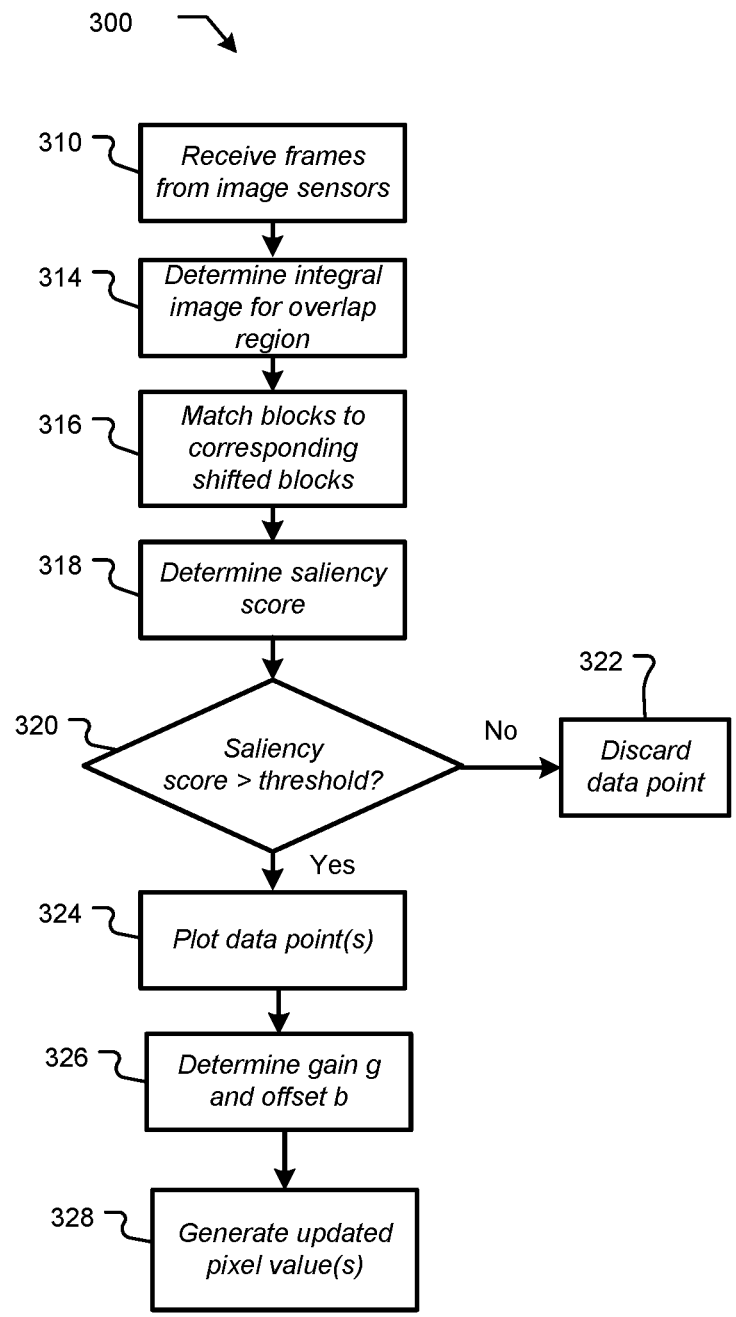
FIG. 6 depicts a process flow that may be executed by an image processor to generate updated pixel values in an overlap region of stitched image frames, in accordance with various aspects of the present disclosure.

FIG. 6 is a process flow that may be executed by image processor 26 or another processor to generate corrected pixel values in an overlap region of stitched image frames, in accordance with various aspects of the present disclosure. The actions of process flow 300 may represent a series of instructions comprising computer readable machine code executable by a processing unit of a computing device and/or by an image processor, such as image processor 26. In various examples, the computer readable machine code may be comprised of instructions selected from a native instruction set of the computing device and/or an operating system of the computing device. Various actions in process flow 300 may be described with reference to elements of FIGS. 1-5.

At action 310 of process flow 300, image processor 26 may receive frames from image sensors. For example, image processor 26 may receive frames 20, 22 from image sensors 10, 12 depicted in FIG. 1. Frames 20, 22 may comprise image data representing portions of the environment 100 within the fields of view of image sensors 10, 12. For example, frames 20, 22 may include two-dimensional grids of pixels. An overlap region of frames 20, 22 may represent different viewpoints of the same object, a portion of the same object, or the same area within real space. For example, frame 20 may include object 18 and frame 22 may include object 16. Objects 16 and 18 in frames 22 and 20, respectively, may be pixel representations captured from differing viewpoints of object 38 (or a portion of object 38) in environment 100.

Processing may continue from action 310 to action 314, "Determine integral image for overlap region." At action 314, an integral image for overlap regions 14a, 14b may be determined in the luminance channel and/or the chrominance channel. In the integral image, each pixel in the two-dimensional grid of frames 20, 22 may take the value of the summation of the luminance values and/or chrominance values of pixels above and to the left of the pixel. The integral image may be divided into a number of blocks. In various examples, the blocks may be rectangular in shape, and may include any number and/or grouping of pixels, as may be appropriate for a particular implementation. In some other examples, the blocks may have non-rectangular shapes, such as ovals, ellipses, triangles, or any desired polygon or other shape.

Processing may continue from action 314 to action 316, "Match blocks to corresponding shifted blocks." At action 316, blocks in overlap region 14a may be matched to corresponding shifted blocks in overlap region 14b. Matching blocks may be digital representations of parallax views of the same portion of environment 100. For example, blocks 16 and 18 from FIG. 1 may represent parallax views of object 38 in environment 100. Block 16 may be matched to corresponding shifted block 18. In some examples, blocks may be matched based on similarities between average luminance values between blocks and/or based on similarities in standard deviations of pixel luminance between blocks. In some other examples, the sum of absolute differences between pixel values and/or the normalized cross correlation of pixel values may be used to match corresponding shifted blocks. Although, in the instant example, block 18 is described as the shifted block, it may be equivalent to describe block 16 as the shifted block. For example, matching block 16 to block 18 may be described as matching block 18 to corresponding shifted block 16. A shift, in terms of the number of pixels in the x direction between matching blocks 16, 18 may be determined. In some examples, the shift may be used to identify other pairs of matching blocks.

Processing may continue from action 316 to action 318, "Determine saliency score." At action 318, a saliency score may be determined for each pair of matching blocks determined at action 316. Saliency scores may be, for example, a confidence score indicating how likely it is that two blocks determined to be matching blocks at action 316 represent parallax views of the same portion of environment 100. Saliency scores may be determined by taking the standard deviation of luminance values of pixels in the block and comparing this standard deviation to the standard deviation of luminance values of pixels in the corresponding shifted block. If the difference value representing the difference between the standard deviations of the pair of blocks is relatively low (e.g., below a threshold value), the saliency scores for the blocks will be high, indicating that the two blocks correspond very closely to one another. Alternatively, if the difference value representing the difference between the standard deviations of the pair of blocks is relatively high (e.g., above a threshold value), the saliency scores for the blocks will be low, indicating that the blocks do not correspond very closely. Alternatively, image processor 26 may take the Fourier transform of the two blocks and determine the frequency of the Fourier coefficients to determine saliency scores for the two blocks. In the example depicted in FIG. 1, the standard deviation of pixel luminance and/or chrominance values in block 16 may be compared with the standard deviation of pixel luminance and/or chrominance values in block 18. In some examples, the standard deviations of block 16 and block 18 may be compared by taking a ratio of the two standard deviation values. Saliency scores may be higher as the value of the ratio approaches 1 and lower as the value of the ratio diverges from 1.

Processing may continue from action 318 to action 320, "Saliency score>threshold?" At action 318, it may be determined whether or not the saliency score for each pair of matched blocks exceeds a threshold value. Different threshold values may be selected and/or optimized depending on the particular application. Additionally, in other implementations, low saliency scores may indicate a close correspondence between blocks.

If a particular saliency score for a pair of matched blocks is not greater than the threshold value, processing may proceed from action 320 to action 322, "Discard data point." At action 322, a pair of matched blocks with a saliency score less than the selected threshold value may be disregarded for purposes of determination of the gain and/or offset in process flow 300. A block which is disregarded for purposes of further processing may still have corrected luminance values and/or chrominance values generated for the pixels in that block according to the techniques described herein, such as by applying the gain and/or offset to chrominance and/or luminance values of the pixels of that block. Additionally, at action 322, blocks with average luminance values which are near zero or near saturation (e.g., within a tolerance such as about 1%, about 2.2%, about 3%, or other desired tolerance) may be discarded for purposes of determination of the gain and offset.

If a particular saliency score for a pair of matched blocks is greater than the threshold value, processing may proceed from action 320 to action 324, "Plot data point(s)." At action 324, if the saliency score for a pair of matched blocks is greater than the selected threshold value, image processor 26 may plot a data point or data points representing average luminance and/or chrominance of the pair of matched blocks. As described previously, instead of plotting data points, image processor 26 may store data points in a data structure that correlates the data points with one another in a manner equivalent to the relationships between the data points in a two dimensional plot. Blocks 16, 18 may be a matched pair of blocks with a saliency score exceeding the threshold value. The average luminance value and/or chrominance value of pixels of block 16 and corresponding block 18 may be plotted as a single point on a two-dimensional graph, as described above with reference to FIG. 4. In another example, for each set of corresponding blocks in overlap regions 14a, 14b, the average luminance value for the block in the left half of the overlap region 14a may be referred to as "Luminance Left", while the average luminance value for the corresponding shifted block in the right half of the overlap region 14b may be referred to as "Luminance Right." Luminance Left values may be incorporated into a first histogram and Luminance Right values may be incorporated into a second histogram, as described above with reference to FIG. 5. In another example, for each set of corresponding blocks in overlap regions 14a, 14b, the average chrominance value for the block in the left half of the overlap region 14a may be referred to as "Chrominance Left", while the average chrominance value for the corresponding shifted block in the right half of the overlap region 14b may be referred to as "Chrominance Right." Chrominance Left values may be incorporated into a first histogram and Chrominance Right values may be incorporated into a second histogram, similar to the techniques described above with reference to FIG. 5.

Processing may continue from action 324 to action 326, "Determine gain g and offset b." At action 326, image processor 26 may determine the gain g and offset b of the data plotted at action 324. For example, a line may be fitted to the data points representing the average luminance values and/or chrominance values of matched pairs of blocks. The gain g may be the slope of the line, while the offset b may be the y-intercept of the line. In another example, different gain values g and offset values b may be applied to the Luminance Left and/or Luminance Right cumulative distribution functions (or Chrominance Left and/or Chrominance Right cumulative distribution functions) until a target distribution is reached. The target distribution may represent an average of the Luminance Left cumulative distribution function and the Luminance Right cumulative distribution function or the average of the Chrominance Left cumulative distribution function and the Chrominance Right cumulative distribution function, depending on whether the techniques described herein are being applied in the luminance channel or the chrominance channel. In some examples, overlap region 14 (including overlap regions 14a, 14b) may be divided into a number of columns. In such examples, gain g and offset b may be determined independently for the respective columns of overlap region 14.

Processing may continue from action 326 to action 328, "Generate updated pixel value(s)." At block 328, updated luminance values and/or chrominance values may be generated based on the determined gain g and offset b. As described above with reference to FIGS. 4 and 5, corrected luminance and/or chrominance values may be determined and/or applied on a pixel-by-pixel basis. Corrected luminance and/or chrominance values may be determined using, for example, equations (2) and (3) described above with reference to FIG. 4. For example, for a given pixel in a given block, the corrected luminance value of that pixel may be determined by inputting the previous luminance value of that pixel into equation (2) or (3) (depending on whether the pixel is in a block in overlap region 14a or 14b). Image processor 26 may output the corrected luminance value for the pixel. In other words, the luminance value of the pixel may be updated by image processor 26. In some examples, corrected luminance values and/or chrominance values may be applied to a subset of the pixels in a particular block. Interpolation may be used to correct remaining pixels for the block. In various examples the shift between corresponding blocks may be used to determine the pixels of overlap region 14 for which to generate the corrected luminance values and/or chrominance values.

Among other potential benefits, a system in accordance with the present disclosure may blend luminance values and/or chrominance values of pixels across the overlap regions of stitched frames to eliminate or reduce the prominence of visible seams in overlap regions of stitched images. Techniques described herein may correct for differences in white balance, luminosity, and/or exposure between different image sensors due to calibration issues and/or differences in light captured by image sensors. Additionally, techniques described in the present disclosure may allow for gradual blending of pixel values across overlap regions of stitched frames when the image sensors capturing the stitched frames use different exposures, resulting in a smooth exposure transition between stitched images when rendered on a display. Such luminance, chrominance, and exposure blending techniques may increase the dynamic range available in stitched images such as panoramic images. Interpolation techniques may be used to correct luminance values and/or chrominance values of a majority of pixels without requiring individual corrected luminance value calculation. Accordingly, interpolation may allow for luminance value correction and/or chrominance value correction across stitched frames while minimizing power consumption and/or processing time for image processors and/or devices including image processors.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An image processing system comprising:
   a first image sensor having a first field-of-view;
   a second image sensor having a second field-of-view, wherein the first field-of-view and the second field-of-view overlap; and
   an image processor having an associated memory, wherein the image processor is programmed to:
   receive, from the first image sensor, a first frame comprising a first plurality of pixels with respective first pixel values, wherein a first subset of pixels of the first plurality of pixels represents a portion of an environment from a first perspective of the first field-of-view;
   receive, from the second image sensor, a second frame comprising a second plurality of pixels with respective second pixel values, wherein a second subset of pixels of the second plurality of pixels represents the portion of the environment from a second perspective of the second field-of-view;
   generate a stitched image frame from the first frame and the second frame, wherein to generate the stitched image frame the image processor is programmed to:
   combine first pixel values of the first subset of pixels with second pixel values of the second subset of pixels to produce a region of pixels with respective third pixel values, wherein each of the third pixel values is an average of a particular first pixel value of the first subset of pixels and a corresponding second pixel value of the second subset of pixels, wherein the particular first pixel value of the first subset is associated with a first location in the first subset of pixels that corresponds to a second location associated with the corresponding second pixel value in the second subset of pixels;
   determine a first average pixel value of a first block of pixels in the region of pixels, wherein the first block of pixels includes a first group of pixels of the region;
   determine a second average pixel value of a second block of pixels in the region, wherein the second block of pixels includes a second group of pixels of the region;
   calculate a first sum of absolute differences between each pixel value of the first block and the first average pixel value of the first block;
   calculate a second sum of the absolute differences between each pixel value of the second block and the second average pixel value of the second block;
   determine that the first block and second block correspond to the same object in the portion of the environment by comparing the first sum and the second sum;
   determine a first data point in a two-dimensional plot, wherein a first coordinate of the data point is the first average pixel value of the first block and a second coordinate of the data point is the second average pixel value of the second block;
   determine a linear relationship between the first data point and a plurality of other data points by fitting a line to the first data point and the plurality of other data points, wherein each of the plurality of other data points represents a pair of corresponding blocks of pixels;
   determine a gain of a corrected pixel channel, wherein the gain is a slope of the line;
   determine an offset of the corrected pixel channel, wherein the offset is a y intercept of the line;
   generate an updated pixel value for a particular pixel of the region by inputting the third pixel value of the particular pixel into an equation, wherein the equation includes the gain and the offset as parameters, and wherein a third location of the updated pixel value corresponds to a fourth location associated with the third pixel value; and
   output an updated stitched frame, wherein the updated stitched frame includes the particular pixel with the updated pixel value.

2. The image processing system of claim 1, wherein the image processor is further programmed to:
   determine a third average pixel value of a third block of pixels in the region, wherein the third block of pixels includes a third group of pixels of the region;
   determine a fourth average pixel value of a fourth block of pixels in the region, wherein the fourth block of pixels includes a fourth group of pixels of the region;
   calculate a third sum of absolute differences between each pixel value of the third block and the third average pixel value of the third block;
   calculate a fourth sum of the absolute differences between each pixel value of the fourth block and the fourth average pixel value of the fourth block;
   determine that the third block and fourth block correspond to the same object in the portion of the environment by comparing the third sum and the fourth sum;

determine a first standard deviation value for the third block of pixels by comparing each pixel value in the third block of pixels to the third average pixel value;

determine a second standard deviation value for the fourth block of pixels by comparing each pixel value in the fourth block of pixels to the fourth average pixel value;

determine a ratio between the first standard deviation value and the second standard deviation value to determine a saliency score of the third block and the fourth block, wherein the saliency score represents a likelihood that the third block and the fourth block correspond to the same object in the portion of the environment;

compare the saliency score to a threshold saliency score;

determine the gain of the corrected pixel channel based at least in part on the third average pixel value and the fourth average pixel value; and determine the offset of the corrected pixel channel based at least in part on the third average pixel value and the fourth average pixel value.

3. The image processing system of claim 1, wherein the image processor is further programmed to:

determine a third average pixel value of a third block of pixels in the region, wherein the third block of pixels includes a third group of pixels of the region;

determine a fourth average pixel value of a fourth block of pixels in the region, wherein the fourth block of pixels includes a fourth group of pixels of the region;

calculate a third sum of absolute differences between each pixel value of the third block and the third average pixel value of the third block;

calculate a fourth sum of absolute differences between each pixel value of the fourth block and the fourth average pixel value of the fourth block; and determine that the third block and fourth block correspond to the same object in the portion of the environment by comparing the third sum and the fourth sum, wherein the first block and the third block are oriented in a first column of the region and wherein the second block and the fourth block are oriented in a second column of the region, wherein the first column and the second column have a first width in terms of a first number of pixels, and wherein a height of the first column and the second column is a height of the region, in terms of a second number of pixels, wherein the second number of pixels is greater than the first number of pixels.

4. A method for generating image data, the method comprising:

receiving, by at least one processor and from a first image sensor, a first frame of image data representing a first field-of-view of a physical environment;

receiving, by the at least one processor and from a second image sensor, a second frame of image data representing a second field-of-view of the physical environment;

generating a third frame of image data based at least in part on the first frame and the second frame, wherein the third frame includes a region of pixels with pixel values that represent a portion of the physical environment from a first perspective of the first field-of-view and from a second perspective of the second field-of-view;

identifying a first block of pixels located in the region, wherein the first block represents a first grouping of first pixel locations;

determining a first average pixel value of pixels located in the first block;

identifying a second block of pixels located in the region, wherein the second block represents a second grouping of second pixel locations;

determining a second average pixel value of pixels located in the second block; and generating an updated pixel value based at least in part on the first average pixel value and the second average pixel value.

5. The method of claim 4, further comprising:

calculating an integral image of the region; and determining a correspondence between the first block and the second block based at least in part on the integral image, wherein the correspondence indicates that first pixel values of the first pixel locations in the first block represent a first perspective view of an object in the physical environment and second pixel values of the second pixel locations in the second block represent a second perspective view of the object.

6. The method of claim 5, further comprising:

determining a shift between the first block and the second block, wherein the shift represents a number of pixels disposed between the first block and the second block in the region.

7. The method of claim 6, further comprising:

identifying a third block of pixels in the region, wherein the third block represents a third grouping of third pixel locations; and identifying a fourth block of pixels in the region based at least in part on the shift, wherein the fourth block represents a fourth grouping of fourth pixel locations, and wherein the fourth block corresponds to the third block.

8. The method of claim 4, further comprising:

identifying a third block of pixels in the region, wherein the third block represents a third grouping of third pixel locations;

identifying a fourth block of pixels in the region, wherein the fourth block represents a fourth grouping of fourth pixel locations; and determining a saliency score of the third block and the fourth block, wherein the saliency score represents a likelihood that the third block represents a first perspective view of the portion of the physical environment and the fourth block represents a second perspective view of the portion of the physical environment.

9. The method of claim 8, further comprising:

comparing the saliency score to a threshold value;

determining a third average pixel value of pixels located in the third block; and determining a fourth average pixel value of pixels located in the fourth block, wherein the updated pixel value is further based at least in part on the third average pixel value and the fourth average pixel value.

10. The method of claim 4, further comprising:

identifying a third block of pixels and a fourth block of pixels in the region, wherein the third block represents a third grouping of third pixel locations, the fourth block represents a fourth grouping of fourth pixel locations, and wherein the third block and the fourth block are aligned along a first axis of a two-dimensional pixel grid of the region in a first column;

determining a third average pixel value of pixels located in the third block and a fourth average pixel value of pixels located in the fourth block;

identifying a fifth block of pixels and a sixth block of pixels in the region, wherein the fifth block represents a fifth grouping of fifth pixel locations, the sixth block represents a sixth grouping of sixth pixel locations, and wherein the fifth block and the sixth block aligned along the first axis of the two-dimensional pixel grid in a second column;

determining a fifth average pixel value of pixels located in the fifth block and a sixth average pixel value of pixels located in the sixth block; and generating a second updated pixel value for a second pixel location, wherein the second pixel location is in the first column or the second column, wherein the second updated pixel value is based at least in part on the third average pixel value, the fourth average pixel value, the fifth average pixel value, and the sixth average pixel value.

11. The method of claim 10, further comprising identifying a shift between the third block and the fourth block, and wherein the third average pixel value, the fourth average pixel value, the fifth average pixel value, and the sixth average pixel value represent average luminance values of pixels of the respective blocks.

12. The method of claim 4, further comprising:
identifying the first average pixel value as a first coordinate of a first data point;
identifying the second average pixel value as a second coordinate of the first data point;
determining a linear relationship between the first data point and a plurality of other data points; and
wherein the generating the updated pixel value is based at least in part on the linear relationship.

13. The method of claim 4, further comprising:
generating a second updated pixel value for a first pixel location of the first block, wherein the second updated pixel value is based at least in part on the first average pixel value and the second average pixel value, and wherein the updated pixel value is associated with a second pixel location of the first block; and
generating a third updated pixel value for a third pixel location of the first block by interpolating between the updated pixel value and the second updated pixel value.

14. An image processing system, comprising:
at least one processor;
a memory configured to be in communication with the at least one processor;
a first image sensor effective to send a first frame of image data to the at least one processor, wherein the first frame represents a first field-of-view of a physical environment; and
a second image sensor effective to send a second frame of image data to the at least one processor, wherein the second frame represents a second field-of-view of the physical environment;
the at least one processor programmed to:
receive the first frame of image data;
receive the second frame of image data;
generate a third frame of image data based at least in part on the first frame and the second frame, wherein the third frame includes a region of pixels with pixel values that represent a portion of the physical environment from a first perspective of the first field-of-view and from a second perspective of the second field-of-view;
identify a first block of pixels located in the region, wherein the first block represents a first grouping of first pixel locations;
determine a first average pixel value of pixels located in the first block;
identify a second block of pixels located in the region, wherein the second block represents a second grouping of second pixel locations;
determine a second average pixel value of pixels located in the second block; and
generate an updated pixel value, wherein the updated pixel value is based at least in part on the first average pixel value and the second average pixel value.

15. The image processing system of claim 14, wherein the at least one processor is further programmed to:
calculate an integral image of the region; and
determine a correspondence between the first block and the second block based at least in part on the integral image, wherein the correspondence indicates that first pixel values of the first pixel locations in the first block represent a first perspective view of an object in the physical environment and second pixel values of the second pixel locations in the second block represent a second perspective view of the object.

16. The image processing system of claim 15, wherein the at least one processor is further programmed to determine a shift between the first block and the second block, wherein the shift represents a number of pixels disposed between the first block and the second block in the region.

17. The image processing system of claim 16, wherein the at least one processor is further programmed to:
identify a third block of pixels in the region, wherein the third block represents a third grouping of third pixel locations; and
identify a fourth block of pixels in the region based at least in part on the shift, wherein the fourth block represents a fourth grouping of fourth pixel locations, and wherein the fourth block corresponds to the third block.

18. The image processing system of claim 14, wherein the at least one processor is further programmed to:
identify a third block of pixels in the region, wherein the third block represents a third grouping of third pixel locations;
identify a fourth block of pixels in the region, wherein the fourth block represents a fourth grouping of fourth pixel locations; and
determine a saliency score of the third block and the fourth block, wherein the saliency score represents a likelihood that the third block represents a first perspective view of the portion of the physical environment and the fourth block represents a second perspective view of the portion of the physical environment.

19. The image processing system of claim 18, wherein the at least one processor is further programmed to:
compare the saliency score to a threshold value;
determine a third average pixel value of pixels located in the third block; and
determine a fourth average pixel value of pixels located in the fourth block, wherein the updated pixel value is further based at least in part on the third average pixel value and the fourth average pixel value.

20. The image processing system of claim 14, wherein the at least one processor is further programmed to apply the updated pixel value for a pixel location of the first block during a coordinate transform of the first frame and the second frame.

* * * * *